HARRY PUTTERMAN
INVENTOR.
BY S. A. Giarratana
F. L. Masselle
T. W. Kennedy
George B. Oujevolk
ATTORNEYS

NON-DESTRUCTIVE READ-OUT MEMORY

Filed April 23, 1965 Sheet 2 of 3

HARRY PUTTERMAN
*INVENTOR.*

BY S. A. Giarratana
F. L. Masselle
T. W. Kennedy
George B. Oujevolk
ATTORNEYS

HARRY PUTTERMAN
INVENTOR.

BY S. A. Giarratana
F. L. Masselle
T. W. Kennedy
George B. Oujevolk
ATTORNEYS

United States Patent Office 3,432,834
Patented Mar. 11, 1969

3,432,834
NON-DESTRUCTIVE READ-OUT MEMORY

Harry Putterman, Elizabeth, N.J., assignor to General Precision Systems Inc., Little Falls, N.J., a corporation of Delaware Filed Apr. 23, 1965, Ser. No. 450,346
U.S. Cl. 340—174 1 Claim
Int. Cl. G11b 5/00

ABSTRACT OF THE DISCLOSURE

An NDRO memory of the coincident-current magnetic core memory matrix type wherein a reset winding is coupled only to those cores which are to be read out with a signal during the read-out sequence. If a plurality of programs are to be stored in the memory, a plurality of reset windings are provided, each winding separately contacting only those cores which are to provide a signal during the read-out sequence, each winding including separate enabling means.

The present invention relates to a solid state, high speed, low power, low cost and high reliability non-destructive read-out (NDRO) memory for the execution of one or more programs. More particularly, the present invention relates to a system making use of a plurality of standard square loop ferrite cores, that are selectively wired-in into a memory stack and which, when connected together with the electronic arrangement contemplated herein form an NDRO memory storing one or more programs.

Storage of a computer program on a plurality of magnetic cores is well known in the art and has been described in numerous textbooks, e.g., R. K. Richards, "Digital Computer Components and Circuits," D. Van Nostrand Company, Inc., 1957 edition, Chapter 8. One bit of information, i.e., a "1" or a "0" is stored on each core and can be supplied by the core in a write-read sequence by a matrix of X and Y wires passing across the cores, each wire carrying a current of $I/2$. A current of $I/2$ is insufficient to enable a core which will only be enabled by a current value of I or the intersection of two wires carrying current of $I/2$. The stored information is then read out by a third wire winding known as the sense winding. With this arrangement the store information or program is destroyed by one write-read sequence.

While this type of ferrite core arrangement has found general acceptance in the destruction read out (DRO) memories of the modern data processor, no reliable low cost element for use in the NDRO memories has been thus far provided in actual practice. It is, indeed, difficult to find two computer systems, made by different manufacturers, that use the same or similar NDRO memories. Thin film, Transfluxor, and the Biax are some of the magnetic elements that have found application in NDRO memories. These memories, however, are neither economical in price because of their high cost/bit (20–30¢ without electronics) nor are they economical in electronic parts because of the "word organized mode" of operation they necessitate. These memories are electrically alterable, i.e., their stored information can be altered electrically at the expense of write-in electronics.

The search for high reliability in airborne processing equipments has led, in recent years, to the wired-in memory which is inherently non-alterable electrically. The Apollo Computer for example uses a core-rope memory designed by MIT, and the IBM–360 series uses a transformer type memory.

Of the two, the core-rope has found more acceptance in airborne application because of the relatively low component count. It is, nonetheless, not very reliable from the operational point of view because of the noise generated by the multitude of current pulses required for interrogating the core rope. A 512 word memory, for example, requires the coincidence of 9 currents. The memory also requires the threading of $(20+n)$ wires through its cores for selection and sensing where $n$ is the number of bits. The size of the core rope memory is, therefore, held down to 512 words and its speed is relatively low 50–100 kilocycles.

The memory of the present invention suffers from no such limitations. Its size may be as large as that of standard DRO memories or about 16,000 words and its speed, because of its read-only mode of operation, may be twice as fast as that of DRO memories (read/write required) or 2–3 megacycles. Furthermore, the component count and power are substantially less than that required for a DRO memory and the cost/bit is less. The memory can also be used for storing more than one program and, thereby further reducing the cost/bit.

This capability of multi-program storage is of great advantage in flight control systems where the program is made dependent on the flight condition for optimum control and/or stabilization. The memory requires the threading of 4 wires for the storing of one program and one additional wire for each additional program. Therefore, an object of the present invention is to provide an NDRO memory with a high storage capacity.

Another object of the present invention is to provide an NDRO memory which can be readily manufactured or assembled and where any program stored therein can be readily changed with little labor.

With the foregoing and other objects in view, the invention resides in the novel arrangement and combination of components and in the details of construction hereinafter described, it being understood that changes in the precise embodiment of the invention herein disclosed may be made within the scope of what is described without departing from the spirit of the invention.

The advantages of the invention will become apparent from the following description taken in conjunction with the accompaying drawing in which.

Generally speaking, the memory system contemplated herein operates in a coincident current mode, i.e., coincidence of two currents, $\bar{x}$ and $\bar{y}$, is required to read out any word from the memory. All the bits, i.e., cores of the words are read out in parallel. During read-out the cores storing "1's" switch to "0" state producing outputs on their respective sense lines. The state of the cores storing "0's" are unaffected in the process and, therefore, produce no signal output. Following read-out all "1" cores are reset to their original "1" state. Again, the "0" cores are unaffected. This is accomplished by passing the reset winding through the "1" cores and bypassing the "0" cores. This is illustrated in FIG. 1 for a single core and in FIG. 2 for a 16 word $n$ bit memory.

Figure 1:
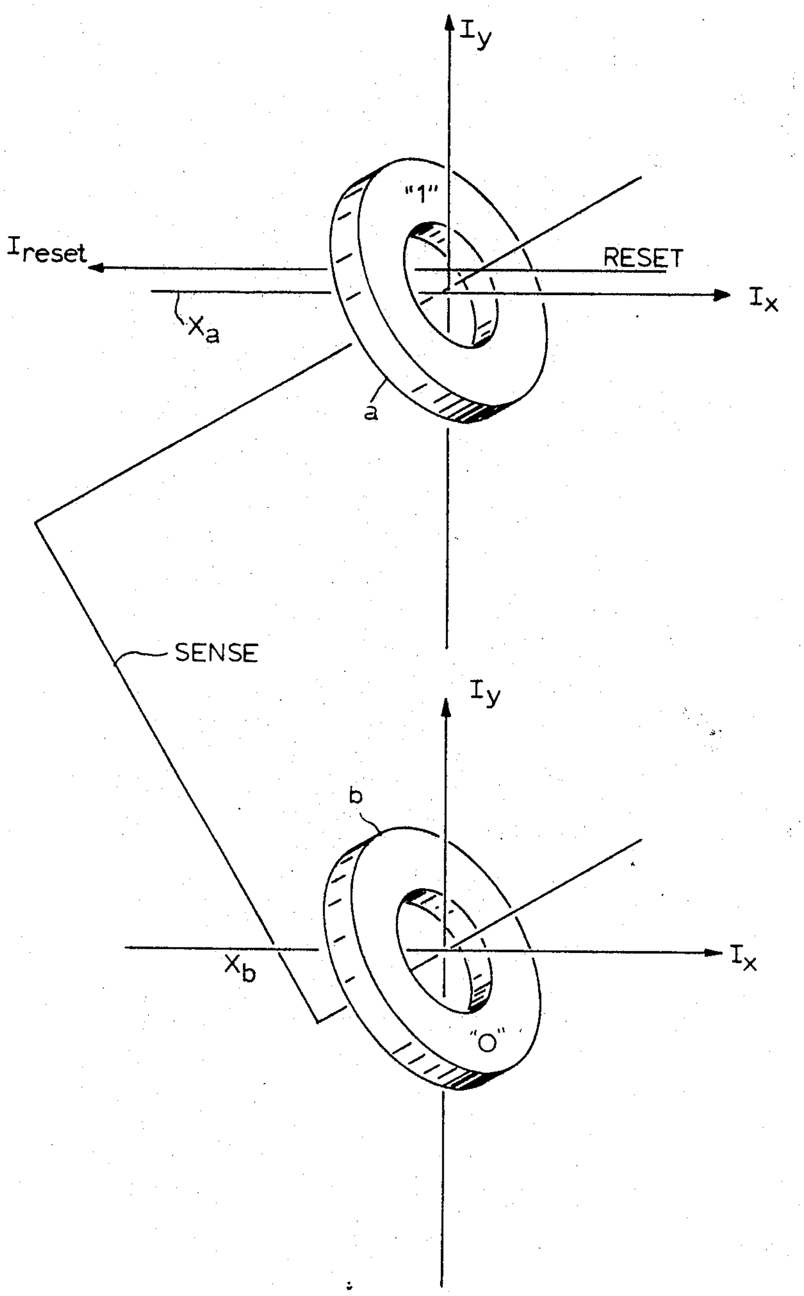
FIG. 1 is a schematic explanation of the basic theory of the memory contemplated herein.

The general pattern of operation is illustrated in FIG. 1 for a program having one "1" and one "0." The memory consists of two cores $a$ and $b$. The "1" is stored on core $a$ while the "0" is stored on core $b$. Passing through the cores is an $\ddot{x}$–$\ddot{y}$ matrix, which in this case consists of windings $\ddot{x}_a$ and $\ddot{x}_b$ in the $\ddot{x}$-plane and winding $y$ in the $y$ plane. There is also a sense winding (so labeled for simplicity) and a reset winding (also so labeled for simplicity).

As in the conventional DRO type of memory, if a "1" is stored in core $a$, during the "write" sequence, because of the coincidence of windings $x_a$ and $y$, during the "read" sequence, core $a$ will be sensed as a "1" by the sense winding, but the "1" is destroyed in the read-out, converting the "1" to a "0." However, core $a$ has something that core $b$ does not have, namely a reset winding, and after the program is completed, i.e., after both cores $a$ and $b$ have finished the "read" sequence, a reset pulse is passed through the reset winding to restore core $a$ to the "1" state. The reset winding, however, does not pass through all the cores but only through the cores which call for a "1" according to the program. Thus, the program is sequentially repeated.

The entire memory or any one bit of the memory can store more than one program by simply adding another reset winding and an ancillary driver for each additional program. This is illustrated by the two programs of bit plane $n$ in FIG. 2. To read-out a given program the corresponding reset driver is enabled and pulsed before each read-out for random access operation or once before the sequential read-out of the entire program.

Figure 2:
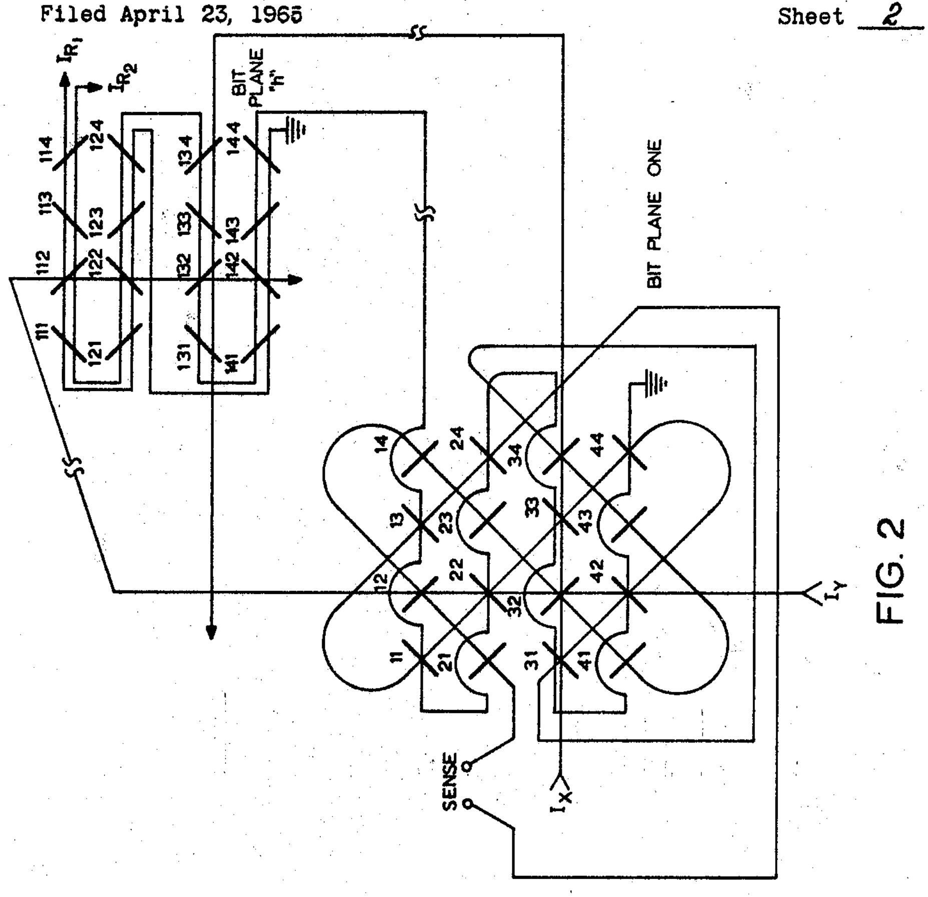
FIG. 2 shows a wiring pattern for a memory utilizing the concept explained in FIG. 1.

In FIG. 2, only one $x$, one $y$ and one sense winding in bit plane one are shown for the sake of clarity. Here, bit plane one is wired for alternate "1's" and "0's" and bit plane $n$ for all "1's" for a first program controlled by $I_{R_2}$ and an arbitrary pattern of "1111111100001111" for a second program controlled by $I_{R_1}$. Thus, in bit plane one, having cores 11, 12, 13, 14, 21, 22, 23, 24, 31, 32, 33, 34, 41, 42, 43, 44, the reset winding $I_{R_2}$ passes only through cores 13, 11, 22, 24, 33, 31, 42, 44. In bit plane $n$, reset winding $I_{R_2}$ passes through all the cores 111 to 144 whereas winding $I_{R_1}$ does not pass through cores 131, 132, 133 and 134.

Figure 3:
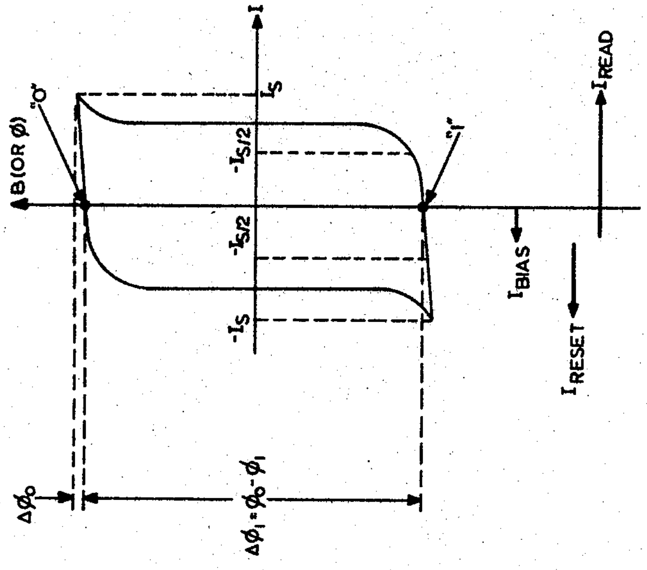
FIG. 3 depicts a hysteresis loop for the cores of the memory explained in FIG. 1.

To minimize the noise output resulting from "half-selected" "1" cores, a D-C bias current is made to flow in the reset windings, shown in FIG. 3. The cores numbered 42, 22, 12, 31, 34 and 33 of bit plane one and cores numbered 142, 122, 112, 131, 133 and 134 of bit plane $n$ are "half-selected" by either the $x$ or the $y$ current. If this bias current is made equal to ⅓ of the full switching current, or $-I_s/3$, and the $x$—$y$ currents to $+\frac{2}{3}I_s$, the "half-selected" cores will only be affected by $\frac{1}{3}I_s$. The noise output under these conditions will, because of the non-linear properties of the cores, be drastically reduced.

It should be noted that the "half-selected" noise is present in conventional DRO memories. The useful signal to noise ratio is, nevertheless, still acceptable if the temperature range is limited and the half-select currents are accurately controlled.

In the present invention as represented in FIG. 3 illustrating a typical hysteresis loop similar to that shown in the aforementioned book by R. K. Richards, on page 375, there is an I bias D-C current flowing through the core. The loop, as in most cases, is not perfectly rectangular, although the "1" and "0" are shown centered at the "top" and "bottom" of the rectangle. In practice, the "1" and "0" occupy other theoretical "locations"; this is technically known as a disturbed "1" or "0" state and causes the noise in the circuit. By raising the operational level, the noise is reduced or controlled within reasonable limits. The bias current improves the signal to noise ratio and, thus, serves to extend the temperature range and/or reduce the accuracy requirements of the constant current drivers. Operation over the temperature range of −55° C.–125° C. is, therefore, possible without temperature compensation.

Figure 4A:
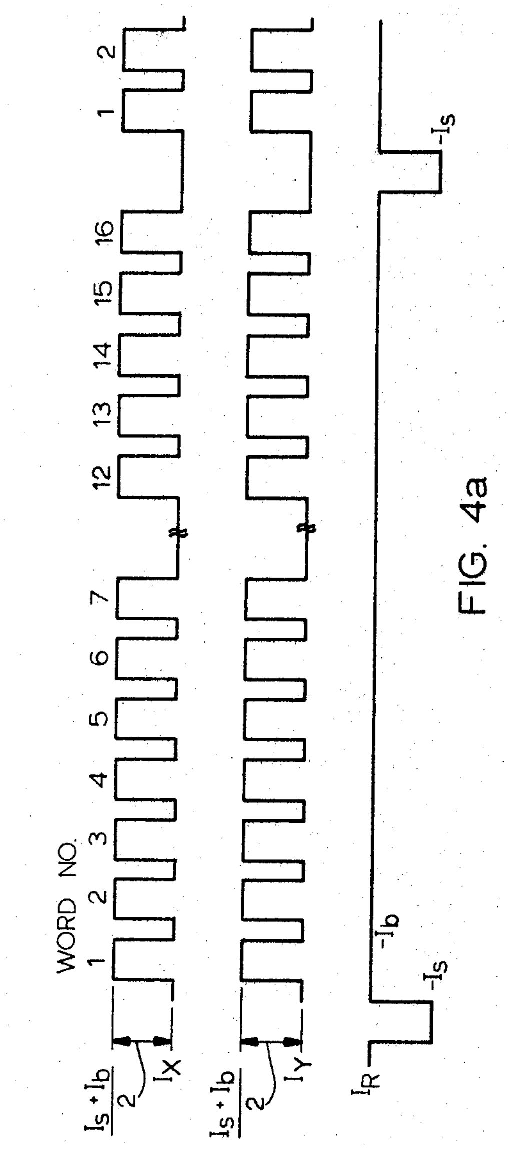
FIGS. 4*a* and 4*b* show schematically the reset current patterns for sequential and random access read out and restoration of memory.
Figure 4B:
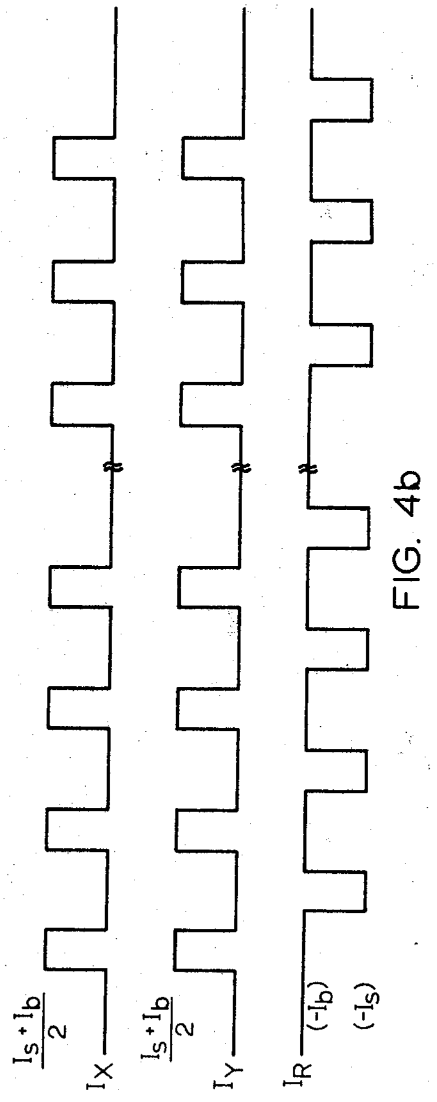

The $x$—$y$ and reset current patterns required for random-access and sequential operation are shown in FIGS. 4$a$ and 4$b$, respectively. In the sequential mode a read-out of a given program is accomplished in less than one-half the time required for the read-out in the random-access mode as could be noted from FIGS. 4$a$ and 4$b$. For the programming point of view, however, the random-access mode is, of course, more flexible.

The component count for the NDRO memory described above is much lower than that required for a conventional DRO ferrite core, coincident current memory. The latter is, incidentally, the most economical of all solid state memories presently available. To read and restore information stored in a DRO memory of $M^2$ words of $n$ bits, each of the following components are required: 4M diodes, $4\sqrt{M}$ drivers, $4\sqrt{M}$ sinks, 4 ($x$—$y$) constant current regulators and $n$ constant current bit drivers. All these must be capable of handling 200–400 ma. depending on the speed required. The NDRO memory, disclosed herein, requires only 2M diodes, M drivers, M sinks, 2 ($x$—$y$) constant current regulators and no bit drivers. Instead of the bit drivers, one reset driver is required. The reduction in components could best be demonstrated by a comparison of the two memories each consisting of 4096 (=64×64) words×10 bits.

| | Conventional DRO | NDRO |
|---|---|---|
| Diodes | 256 | 128 |
| Drivers | 32 | 8 |
| Sinks | 32 | 8 |
| Regulators | 4 | 2 |
| Constant current bit drivers | 10 | 0 |
| Reset driver | 0 | 1 |

The power dissipated in an NDRO memory is also much lower. For 10 bit drivers alone, for a 2 microsecond memory, require about 12 watts (=10×300 ma.×12 volts×35% duty cycle).

It is to be observed, therefore, that the present invention provides for an NDRO memory of the coincident-current magnetic core memory matrix type wherein a reset winding is coupled only to those cores which are to be read out with a signal during the read-out sequence and, if a plurality of programs are to be stored in the memory, a plurality of reset windings are provided, each winding separately contacting only those cores which are to provide a signal during the read out sequence, each winding including separate enabling means. The present invention also provides for a method of storing one or more programs into a coincident-current magnetic core matrix, comprising the steps of coupling one reset winding for each program to each one of selected cores which are to provide a signal during the program read out and skipping those cores which are not to provide a signal during the program read out, enabling said selected cores with the particular winding for said program, reading out said matrix and repeating the step of enabling said selected cores. To provide a better signal-to-noise ratio, a bias current can also be supplied through the reset winding, preferably of the order of one-third of the full switching current.

While there has been described what at present are believed to be the preferred embodiments of this invention, it will be obvious to those skilled in the art that various modifications can be made therein within the scope of the invention, and it is intended that the appended claims cover all such modifications.

What is claimed is:

1. A method of storing one or more programs into a coincident-current magnetic core matrix, comprising the steps of coupling one reset winding for each program to each one of selected cores which are to provide a signal during the program read out, skipping those cores which are not to provide a signal during the program read out, enabling said selected cores with the particular winding for said program, reading out said matrix and repeating the step of enabling said selected cores, including the supplying of a bias current through said reset winding of the order of one-third the full switching current.

References Cited

UNITED STATES PATENTS

| | | | |
|---|---|---|---|
| 3,215,992 | 11/1965 | Schallerer | 340—174 |
| 2,942,239 | 6/1960 | Eckert et al. | 340—174 |

JAMES W. MOFFITT, *Primary Examiner.*